(12) United States Patent
Li et al.

(10) Patent No.: US 12,146,818 B2
(45) Date of Patent: Nov. 19, 2024

(54) EXPERIMENTAL DEVICE AND METHOD FOR TESTING FOAM FLUID PROPERTIES AND DEFOAMING SEPARATION EFFECTS

(71) Applicant: CHINA UNIVERSITY OF PETROLEUM (EAST CHINA), Shandong (CN)

(72) Inventors: Yuxing Li, Qingdao (CN); Qihui Hu, Qingdao (CN); Cuiwei Liu, Qingdao (CN); Wuchang Wang, Qingdao (CN); Lingya Meng, Qingdao (CN); Jinghan Wang, Qingdao (CN); Hongtao Ma, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 322 days.

(21) Appl. No.: 17/774,037

(22) PCT Filed: Nov. 3, 2020

(86) PCT No.: PCT/CN2020/126250
§ 371 (c)(1),
(2) Date: Jul. 26, 2022

(87) PCT Pub. No.: WO2021/088827
PCT Pub. Date: May 14, 2021

(65) Prior Publication Data
US 2022/0412862 A1    Dec. 29, 2022

(30) Foreign Application Priority Data
Nov. 4, 2019   (CN) .......................... 201911067678.0

(51) Int. Cl.
*G01N 13/02*   (2006.01)
*B01D 19/00*   (2006.01)
*B01F 23/235*  (2022.01)

(52) U.S. Cl.
CPC ......... *G01N 13/02* (2013.01); *B01D 19/0057* (2013.01); *B01D 19/0063* (2013.01); *B01F 23/235* (2022.01); *G01N 2013/0241* (2013.01)

(58) Field of Classification Search
CPC .............. G01N 13/02; G01N 15/0227; G01N 2013/0241; G01N 2015/004;
(Continued)

(56) References Cited

U.S. PATENT DOCUMENTS

2006/0249463 A1* 11/2006 Davis .................... B01D 19/02
210/194

FOREIGN PATENT DOCUMENTS

| CN | 205157480 U | 4/2016 |
| CN | 105588922 A | 5/2016 |

(Continued)

OTHER PUBLICATIONS

Jan. 27, 2021 Search Report issued in International Patent Application No. PCT/CN2020/126250.
(Continued)

*Primary Examiner* — Andre J Allen
(74) *Attorney, Agent, or Firm* — Oliff PLC (57) ABSTRACT

An experimental device and method for testing foam fluid properties and defoaming separation effects, the experimental device including a foam generation module configured to generate a foam fluid, an experimental loop configured to transport the foam fluid and enable the foam fluid to sufficiently develop in a loop, a foam property test module configured to test foam fluid properties, a foam separation processing module configured to separate foam from fluid
(Continued)

and gas, and a defoaming result evaluation module configured to test and evaluate defoaming results. In the method, different foam fluids are generated in the foam generation module and are transported to the foam property test module and different foam separation processing modules through the experimental loop, and the foam properties of the foam fluids and defoaming separation effects are measured by the foam property test module and the defoaming result evaluation module connected to the foam separation processing module.

8 Claims, 1 Drawing Sheet

(58) Field of Classification Search
CPC ............ B01D 19/0057; B01D 19/0063; B01D 19/02; B01F 23/235
See application file for complete search history.

(56) References Cited

FOREIGN PATENT DOCUMENTS

| | | | | |
|---|---|---|---|---|
| CN | 206787890 U | | 12/2017 | |
| CN | 208187454 U | | 12/2018 | |
| CN | 110763599 A | | 2/2020 | |
| CN | 114295775 B | * | 8/2023 | |
| CN | 116550012 A | * | 8/2023 | ......... B01D 19/0031 |
| CN | 107271644 B | * | 12/2023 | ......... G01N 33/2823 |
| WO | 00/59616 A1 | | 10/2000 | |

OTHER PUBLICATIONS

Jan. 27, 2021 Written Opinion of the International Search Report issued in International Patent Application No. PCT/CN2020/126250.

* cited by examiner

EXPERIMENTAL DEVICE AND METHOD FOR TESTING FOAM FLUID PROPERTIES AND DEFOAMING SEPARATION EFFECTS

TECHNICAL FIELD

The present disclosure belongs to the technical field of oil-gas separation test experiments in oil-gas gathering and transportation systems, and particularly relates to an experimental device and method for testing foam fluid properties and defoaming separation effects.

BACKGROUND

The statements in this section merely provide the background art information related to the present disclosure, and do not necessarily constitute the prior art.

$CO_2$ flooding refers to injecting $CO_2$ into an oil layer and using $CO_2$ as an oil displacement agent, in the process of crude oil collection, which can achieve the effects of reducing the displacement resistance, reducing the crude oil viscosity, promoting the crude oil volume expansion and miscibility effect, etc., thereby improving the crude oil recovery ratio; and the $CO_2$ gas is reasonably used, which can also reduce greenhouse gas emissions, so that the application prospects are broad.

$CO_2$ has higher solubility in oil and water and is more soluble in oil, so that the $CO_2$ flooding produced fluid shows the characteristic of high foam content. These foams will cause harm to the gathering and transportation of crude oil in many aspects: the foams will cause incomplete oil-gas separation and reduce the processing capacity; the error of instrument measurement is increased; the existence of a large number of foams in a separator will occupy the gas-phase space of the separator, which seriously affects the gas-liquid separation effect and increases the separation time; and the existence of a large number of foams also cause the crude oil to escape from a tank.

Therefore, testing the properties of the $CO_2$ flooding produced foam fluid, optimizing and improving the defoaming separation technology, and providing a relatively comprehensive and reasonable separation effect evaluation method can provide a powerful guarantee for the subsequent safe operation of oil and gas gathering and transportation processing devices, and provide an important technical support for $CO_2$ flooding oilfield development. How to mix oil and gas can be obtained more clearly by measuring and analyzing the properties of the $CO_2$ flooding produced foam fluid, the defoaming separation effect can be obtained by testing the defoaming separation effect, and the separator is improved in the corresponding direction to optimize and improve the defoaming separation effect in the separator.

The analysis of the foam fluid in the prior art is insufficient. Firstly, there is no quantitative solution to the influence of the mixing ratio of $CO_2$ gas and oil-water mixed liquid on foam properties and defoaming separation. Secondly, the measuring means is relatively simple, and only the influence of one separation device on the defoaming separation effect is considered. Thirdly, there is the influence of the input of unsolved redundant variables on the foam fluid production process in the prior art. Fourthly, there is no focus on the special problems of the $CO_2$ flooding produced liquid in the gas-liquid separation process.

SUMMARY

In order to solve the above problems, the present disclosure provides an experimental device and method for testing foam fluid properties and defoaming separation effects.

A first objective of the present disclosure is to provide an experimental device for testing foam fluid properties and defoaming separation effects. The experimental device measures the properties of the generated sufficiently developed foam fluids and evaluates the defoaming separation effects.

A second objective of the present disclosure is to provide a foam generation module which can generate fluid foams with different gas-liquid mixing ratios, and one experimental device can measure the fluid foams with different gas-liquid mixing ratios under different conditions.

A third objective of the present disclosure is to provide an experimental method using the experimental device for testing foam fluid properties and defoaming separation effects. According to the experimental method, the properties of foam fluids and defoaming separation effects can be measured accurately and conveniently.

To achieve the foregoing objective, the present disclosure adopts the following technical solutions:

An experimental device for testing foam fluid properties and defoaming separation effects includes a foam generation module configured to generate a foam fluid, an experimental loop configured to transport the foam fluid and enable the foam fluid to sufficiently develop in a loop, a foam property test module configured to test foam fluid properties, a foam separation processing module configured to separate foam from fluid and gas, and a defoaming result evaluation module configured to test and evaluate defoaming results. A tail end of the foam generation module is connected to the experimental loop, the oil-water mixed liquid and the $CO_2$ gas are simultaneously input into the foam generation module and mixed into different ratios of oil-water and gas to form a foam fluid, and the foam fluid formed after mixing is transported into the experimental loop, and then respectively transported into the foam property test module and the foam separation processing module at a tail end of the experimental loop from the experimental loop. In the foam property test module, the sufficiently developed foam fluid input from the experimental loop is measured and analyzed to obtain the foam volume, half foam life period and foam quality of the foam fluid. In the foam separation processing module, the sufficiently developed foam fluid input from the experimental loop is separated into gas and liquid. The foam separation processing module is provided with the defoaming result evaluation module, and the defoaming result evaluation module analyzes the gas separated by the foam separation processing module to obtain a liquid content in the gas, a droplet size in the gas and an oil content in the gas.

Further, the foam generation module includes: an oil-water mixing kettle, a $CO_2$ gas cylinder and a foam generation device, and the foam generation device is connected to the oil-water mixing kettle and the $CO_2$ gas cylinder through connecting pipelines. The connecting pipeline from the oil-water mixing kettle to the foam generation device is sequentially provided with a second centrifugal pump and a first flow meter according to a liquid flow direction, and the connecting pipeline from the $CO_2$ gas cylinder to the foam generation device is sequentially provided with a gas storage tank and a first gas-phase flow meter according to a gas flow direction. The oil-water mixed liquid in the oil-water mixing kettle controlled by the second centrifugal pump and the $CO_2$ gas in the $CO_2$ gas cylinder calculated by the first flow meter enter the inside of the foam generation device through a liquid-phase pipeline inlet at a bottom of the foam generation device and a gas-phase pipeline inlet on a side wall of the foam generation device, so as to form foam fluids with different gas-liquid mixing ratios.

Preferably, a stainless steel wire mesh with mesh holes is arranged inside the foam generation device, the gas-phase pipeline inlet and the liquid-phase pipeline inlet of the foam generation device are arranged at 90° in space, a layer of insulation fiber is arranged above the liquid-phase pipeline inlet, and the insulation fiber is arranged inside the foam generation device. On the one hand, the heated gas enters the inside of the foam generation device and is mixed with the oil-water liquid to generate a foam fluid, and the generated foam fluid also needs to be insulated. On the other hand, a plurality of fiber thorns are distributed in the insulation fiber, the oil-water mixed liquid is pumped into the foam generation device by the second centrifugal pump, and these oil-water mixed liquids collide with each other in the pipeline, so that the oil-water mixed liquid carries a large number of bubbles and foams. The insulation fiber can reduce the carrying volume of the bubbles and foams in the oil-water mixed liquid.

Further, the foam property test module includes an analysis tank. A lower end of the analysis tank is provided with a liquid-phase outlet, and a side wall of the analysis tank is provided with a gas outlet. A first absorption box and a first sampling valve are sequentially installed outward from the gas outlet. A water-absorbing and oil-absorbing material is placed in the first absorption box, and the quality difference of the water-absorbing and oil-absorbing material in the first absorption box before and after an experiment is measured. The first sampling valve is connected to a gas collection bag through a pipeline. The analysis tank is a visualized tank body, and a side wall of the tank body is provided with standard scales.

Further, the foam separation processing module includes a horizontal separator, the horizontal separator is a visualized tank body, and a side wall of the tank body is provided with standard scales. A lower end of the horizontal separator is provided with a liquid-phase outlet, and the periphery of the lower end of the horizontal separator is coated with a second heating jacket. An upper end of the horizontal separator is provided with a gas-phase outlet, and the gas-phase outlet is connected to the defoaming result evaluation module. The upper end of the horizontal separator is also provided with a pipe column type cyclone separator, and a lower end of the pipe column type cyclone separator is communicated to the horizontal separator. The main pipeline at the tail end of the experimental loop is also provided with a third bypass pipeline, and the third bypass pipeline is connected to the pipe column type cyclone separator. The foam fluid enters the pipe column type cyclone separator through the third bypass pipeline of the experimental loop, and then flows into the horizontal separator from the pipe column type cyclone separator. A foam fluid inlet of the pipe column type cyclone separator is provided with a gas-phase outlet, the gas-phase outlet of the pipe column type cyclone separator is communicated to the gas-phase outlet of the horizontal separator through a gas pipe, and the gas-phase outlet of the horizontal separator is connected to the defoaming result evaluation module. Two different separation devices for enabling the foam fluid to directly enter the horizontal separator for separation and first enter the pipe column type cyclone separator and then enter the horizontal separator for separation are provided, which represents two different processing ideas for a single separation device and pre-separation and then separation. The better separation method of the two can be selected according to the measured defoaming separation effect.

Further, the defoaming result evaluation module includes a droplet size observation window and a second absorption box at a tail end of the droplet size observation window. The gas separated by the foam separation processing module sequentially passes through the droplet size observation window and the second absorption box. An outlet of second absorption box is provided with two pipelines. The first pipeline is communicated to the atmosphere, and the first pipeline is provided with a second gas-phase flow meter. The second pipeline is provided with a second sampling valve, and the second sampling valve is connected to the gas collection bag through a gas pipe. A water-absorbing and oil-absorbing material is placed in the second absorption box.

Preferably, in the present disclosure, the water-absorbing and oil-absorbing material can be weighed before and after an experiment to obtain a quality difference; an indication of the second gas-phase flow meter at the gas-phase outlet of the horizontal separator can be read to calculate a liquid content in the gas after separation; foam layers of the horizontal separator can be shot by a high-speed camera to complete the statistics of bubble size distribution; and the droplet size observation window at the gas-phase outlet of the horizontal separator can be detected by a laser particle size analyzer to analyze droplet sizes in a gravity settling zone, and pressure differences before and after separation in the foam separation processing module can be calculated to calculate a pressure difference during separation.

By using the technical solution disclosed above, the present disclosure provides an experimental method for testing foam fluid properties and defoaming separation effects, including:

step 1: preparation stage: introducing $CO_2$ gas into the entire experimental device to remove impurities in the pipe;

step 2: foam fluid generation stage: introducing the $CO_2$ gas with a required gas flow rate into the foam generation device, transporting the oil-water mixed liquid with a required liquid flow rate into the foam generation device at the same time, and mixing the $CO_2$ gas and the oil-water mixed liquid in the foam generation device to generate a foam fluid;

step 3: foam fluid transportation stage: transporting the foam fluid into the experimental loop, communicating the first bypass pipeline to discharge unstable and insufficiently developed foam, and after the output of the foam fluid is stable, communicating the second bypass pipeline to input the foam fluid into the foam property test module;

step 4: foam fluid defoaming stage: communicating the main pipeline at the tail end of the experimental loop to enable the foam fluid to enter the horizontal separator, and when a liquid level of the foam fluid reaches half the height of the separator, closing the input of the foam fluid so that the foam fluid no longer enters the horizontal separator; and step 5: test stage: measuring the foam volume in the foam property test module, analyzing the half foam life period, and measuring the foam quality; weighing the water-absorbing and oil-absorbing material before and after an experiment to obtain a quality difference; reading an indication of the second gas-phase flow meter at the gas-phase outlet of the horizontal separator to calculate a liquid content in the gas after separation; shooting foam layers of the horizontal separator by a high-speed camera to complete the statistics of bubble size distribution; and detecting the droplet size observation window at the gas-phase outlet of the horizontal separator by a laser particle size analyzer to analyze droplet sizes in a gravity settling zone, and calculating pressure differences before and after separation in the foam separation processing module to calculate a pressure difference during separation.

Further, in the foam fluid defoaming stage, the present disclosure provides another defoaming method, including: communicating the third bypass pipeline to enable the foam fluid to enter the pipe column type cyclone separator and then enter the horizontal separator, and when a liquid level of the foam fluid reaches half the height of the separator, closing the input of the foam fluid so that the foam fluid no longer enters the horizontal separator.

Compared with the prior art, the present disclosure has the following beneficial effects:
1. The foam generation module in the present disclosure can generate different ratios of foam fluids by inputting different ratios of gas and liquid, and the transportations and properties of different foam fluids and defoaming separation effects are measured and evaluated.
2. The foam generation device in the present disclosure can statically mix gas and liquid under the action of the stainless steel wire mesh, thereby avoiding the influence of dynamic mixing devices such as stirring impellers on the state of the foam fluid.
3. A layer of insulation fiber is arranged above the liquid-phase pipeline inlet of the foam generation device in the present disclosure, and the insulation fiber is arranged inside the foam generation device, thereby reducing the carrying volume of the bubbles and foams in the oil-water mixed liquid, and providing insulation for the oil-water mixed liquid.
4. The experimental loop in the present disclosure can enable the foam fluid to sufficiently develop, and transport the sufficiently developed foam fluid into a corresponding measuring device.
5. The present disclosure provides two ideas of defoaming separation, which can perform experimental measurements respectively. This set of experimental test device is of great significance to study the special problems of $CO_2$ flooding produced liquid in a gas-liquid separation process, and can optimize the structures of traditional separators in a targeted manner and test expected gas-liquid separation effects, thereby providing a reference for the design and operation of gas-liquid separators in oil fields.
6. The present disclosure can simulate and perform the visualized foam property test of $CO_2$ flooding produced fluids, the optimization of defoaming components of separators, and the evaluation of defoaming separation effects.

BRIEF DESCRIPTION OF THE DRAWINGS

The accompanying drawings constituting a part of the present disclosure are used to provide further understanding of the present disclosure, and exemplary embodiments and descriptions of the present disclosure are used to explain the present disclosure and do not constitute an improper limitation on the present disclosure.

1. water tank, 2. first centrifugal pump, 3. first valve, 4. first temperature sensor, 5. oil-water mixing kettle, 6. second valve, 7. third valve, 8. second centrifugal pump, 9. fourth valve, 10. first liquid-phase flow meter, 11. fifth valve, 12. $CO_2$ gas cylinder, 13. sixth valve, 14. seventh valve, 15. first pressure sensor, 16. second temperature sensor, 17. gas storage tank, 18. first heating jacket, 19. eighth valve, 20. ninth valve, 21. second pressure sensor, 22. first gas-phase flow meter, 23. tenth valve, 24. foam generation device, 25. eleventh valve, 26. twelfth valve, 27. analysis tank, 28. third pressure sensor, 29. first absorption box, 30. first sampling valve, 31. thirteenth valve, 32. fourteenth valve, 33. fifteenth valve, 34. fourth pressure sensor, 35. sixteenth valve, 36. fifth pressure sensor, 37. sixth pressure sensor, 38. seventeenth valve, 39. seventh pressure sensor, 40. horizontal separator, 41. second heating jacket, 42. eighteenth valve, 43. droplet size observation window, 44. second absorption box, 45. nineteenth valve, 46. second gas-phase flow meter, 47. second sampling valve, 48. twentieth valve, 49. twenty-first valve, 50. experimental loop, 51. third temperature sensor, 52. pipe column type cyclone separator;

100. foam generation module, 200. foam property test module, 300. foam separation processing module, 400. defoaming result evaluation module.

DETAILED DESCRIPTION

The present disclosure is further described below with reference to the accompanying drawings and embodiments.

It should be noted that the following detailed description is exemplary and intended to provide further explanation of the present disclosure. Unless otherwise defined, all technical and scientific terms used herein have the same meaning as commonly understood by a person of ordinary skill in the art to which the present disclosure belongs.

It should be noted that the terms used herein is for the purpose of describing specific embodiments only, and is not intended to limit the exemplary embodiments according to the present disclosure. As used herein, unless clearly defined in the context otherwise, the singular is intended to include the plural as well. In addition, it should also be understood that the terms "comprising" and/or "including" used in this specification indicate the presence of features, steps, operations, devices, components, and/or a combination thereof.

In the present disclosure, the orientation or positional relationships denoted by the terms such as "top", "bottom", "left", "right", "front", "rear", "vertical", "horizontal", "side", and "bottom" are based on the orientation or positional relationships shown in the accompanying drawings, and these terms are only relational words determined for the convenience of describing the structural relationships between components or elements of the present disclosure, and do not specifically refer to any component or element in the present disclosure, and should not be construed as limiting the present disclosure.

In the present disclosure, terms such as "fixedly connected", "connected", "connect" should be understood in a broad sense, which may be fixedly connected, integrally connected or detachably connected; or may be directly connected, or indirectly connected through an intermediate medium. For the relevant scientific research or technical personnel in the field, the specific meanings of the terms in the present disclosure can be determined according to specific situations, and should not be construed as a limitation on the present disclosure.

Embodiment 1

Figure 1:
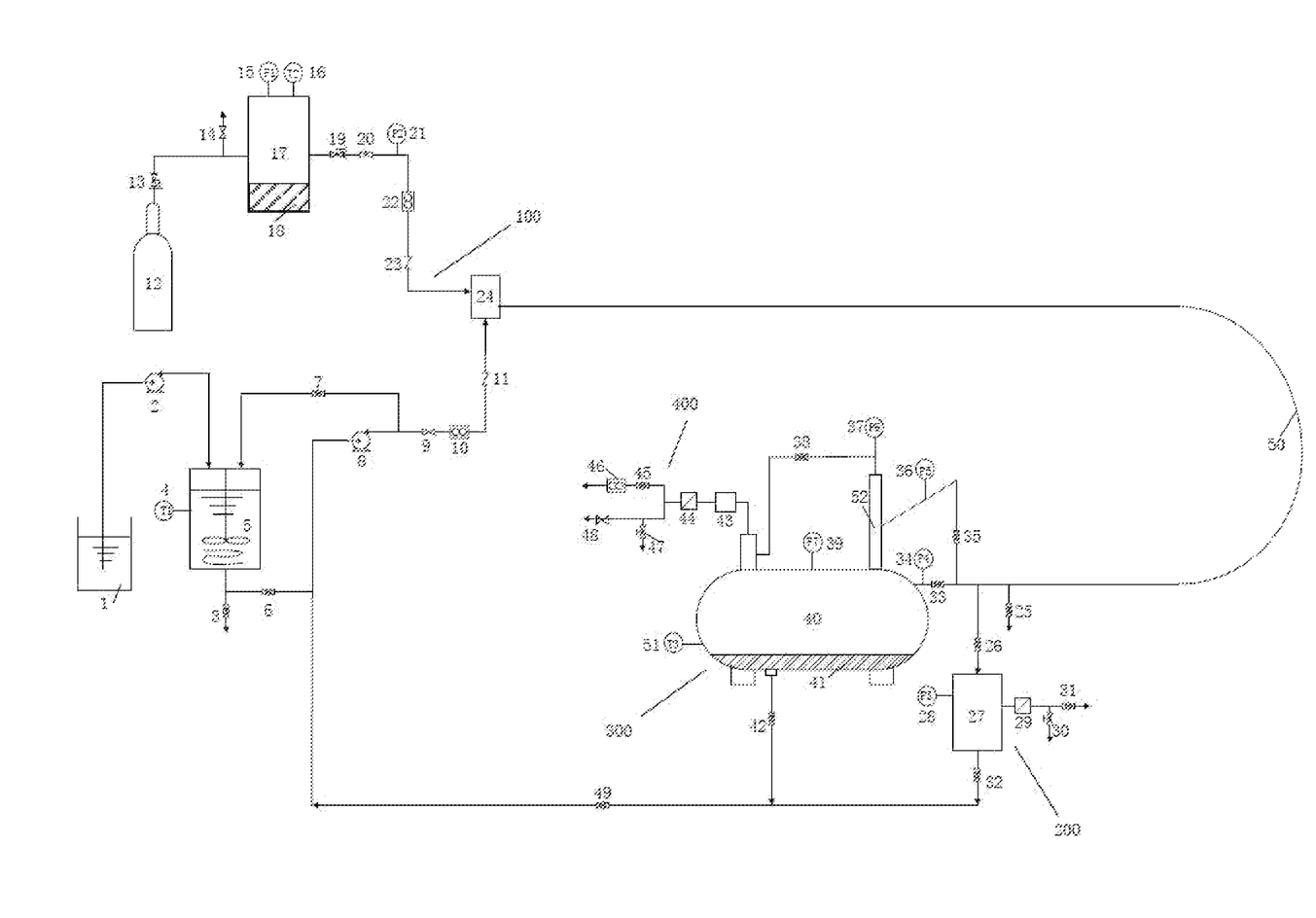
FIG. 1 is a schematic structural diagram of an experimental device for measuring foam fluid properties and defoaming separation effects in the present disclosure.

The present disclosure provides an experimental device for testing foam fluid properties and defoaming separation effects. The experimental device is configured to test and evaluate the foam properties and defoaming separation effects of $CO_2$ flooding produced fluids in gathering and transportation separation. The experimental device includes a foam generation module 100 configured to generate a foam fluid, an experimental loop 50 configured to transport the foam fluid and enable the foam fluid to sufficiently develop in a loop, a foam property test module 200 configured to test foam fluid properties, a foam separation processing module 300 configured to separate foam from fluid and gas, and a defoaming result evaluation module 400 configured to test and evaluate defoaming results. Details are as follows:

The foam generation module 100 is configured to generate a foam fluid for simulating the foam fluid generated after $CO_2$ and an oil layer are mixed in a certain ratio in real work. The foam generation module 100 includes an oil-water mixing kettle 5, a gas storage tank 17 connected to a $CO_2$ gas cylinder 12, and a foam generation device 24 connected to the oil-water mixing kettle 5 and the gas storage tank 17.

A variable frequency stirring motor and a heating rod with a controllable heating temperature are installed in the oil-water mixing kettle 5, a kettle cover at an upper end of the oil-water mixing kettle 5 is provided with a liquid-phase backflow inlet, and the liquid-phase backflow inlet is provided with a third valve 7 for re-circulating the liquid after a test into the oil-water mixing kettle 5, so that the liquid can be recycled. A first temperature sensor 4 is installed on a kettle body of the oil-water mixing kettle 5, and the first temperature sensor 4 is configured to measure the temperature of the liquid in the kettle and acquire and display the temperature in real time. A drain outlet is installed at a bottom of the kettle, and a first valve 3 is installed on the drain outlet. After the first valve 3 is opened, the liquid in the oil-water mixing kettle 5 can be discharged to the outside for next processing. A second valve 6, a second centrifugal pump 8, a fourth valve 9, a first liquid-phase flow meter 10 and a fifth valve 11 are sequentially installed on a connecting pipeline between a liquid outlet at a lower end of the oil-water mixing kettle 5 and a liquid-phase pipeline inlet at a bottom of the foam generation device 24. When the second valve 6, the second centrifugal pump 8, the fourth valve 9 and the fifth valve 11 are opened and the first valve 3 is closed, under the action of the second centrifugal pump 8, the liquid in the oil-water mixing kettle 5 is pumped into the foam generation device 24, the oil-water mixing kettle 5 pumps water from the water tank through the first centrifugal pump 2, and liquids with different oil-water ratios are formed in the oil-water mixing kettle 5.

The gas in the $CO_2$ gas cylinder 12 is transported into the gas storage tank 17 through a gas transportation pipeline, and the high-pressure gas in the $CO_2$ gas cylinder 12 becomes $CO_2$ gas under a stable pressure through expansion. A lower end of the gas storage tank 17 is coated with a first heating jacket 18 for heating the gas in the gas storage tank 17, so that the gas storage tank 17 can provide gases with different temperatures. A first pressure sensor 15 and a second temperature sensor 16 are installed on the gas storage tank 17 and are configured to detect the pressure and temperature of the gas in the gas storage tank 17 in real time. A sixth valve 13 and a seventh valve 14 are sequentially installed between the $CO_2$ gas cylinder and the gas storage tank 17, the sixth valve 13 is installed on a main gas transportation pipeline between the $CO_2$ gas cylinder and the gas storage tank 17, and the seventh valve 14 is installed on a bypass on the main gas transportation pipeline. When the sixth valve 13 is opened and the seventh valve 14 is closed, the gas in the $CO_2$ gas cylinder enters the gas storage tank. When the sixth valve 13 is closed and the seventh valve 14 is opened, the gas in the $CO_2$ gas cylinder is discharged into the atmosphere. The gas in the gas storage tank 17 enters the foam generation device 24 through an eighth valve 19, a ninth valve 20, a first gas-phase flow meter 22 and a tenth valve 23. A second pressure sensor 21 is installed on a gas transportation pipeline between the ninth valve 20 and the first gas-phase flow meter 22 and is configured to detect the pressure of the gas input from the gas storage tank 17 to the foam generation device 24.

The foam generation device 24 is configured to mix and stir gas and liquid phases under different conditions to form a foam fluid. The overall shape of the device is cylindrical, and an internal cavity is a cylindrical cavity. The gas-phase pipeline inlet formed on the foam generation device 24 is configured to introduce $CO_2$ gas, the gas-phase pipeline inlet is connected to the gas storage tank 17, and preferably, the gas-phase pipeline inlet is formed on a side wall of the foam generation device 24. A lower end of the foam generation device 24 is provided with a liquid-phase pipeline inlet for connecting with the oil-water mixing kettle 5, the gas-phase pipeline inlet and the liquid-phase pipeline inlet are arranged at 90° in space, and the foam generation device 24 is filled with a stainless steel wire mesh with holes. Liquid and gas are introduced into the foam generation device 24 and are fully mixed under the action of the stainless steel wire mesh to generate a foam fluid, and the foam fluid enters the experimental loop 50 through a mixed phase outlet at the bottom of the foam generation device 24. In the foam generation device 24, the gas under different pressures, temperatures and flow rates and the liquid under different temperatures and flow rates are mixed to form a variety of different foam fluids, and the foam fluids are output.

A layer of insulation fiber is arranged above the liquid-phase pipeline inlet of the foam generation device 24, and the insulation fiber is arranged inside the foam generation device. On the one hand, the heated gas enters the inside of the foam generation device and is mixed with the oil-water liquid to generate a foam fluid, and the generated foam fluid also needs to be insulated. On the other hand, a plurality of fiber thorns are distributed in the insulation fiber, the oil-water mixed liquid is pumped into the foam generation device by the second centrifugal pump, and these oil-water mixed liquids collide with each other in the pipeline, so that the oil-water mixed liquid carries a large number of bubbles and foams. The insulation fiber can greatly reduce the carrying volume of the bubbles and foams in the oil-water mixed liquid.

The experimental loop 50 of the present disclosure is configured to transport the foam fluid into the foam property test module 200 and the foam separation processing module 300, and enable the foam fluid to develop in the experimental loop 50. A start point of the experimental loop 50 is calculated from the mixed phase outlet of the foam generation device 24, and an end point is located at a mixed phase inlet leading to the foam separation processing module 300. The experimental loop 50 is set as a visualized pipeline for observing the state of the foam fluid in the experimental loop 50 and observing the interaction between different flow patterns and foams. A main pipeline at the tail end of the experimental loop 50 is provided with two bypass pipelines, namely a first bypass pipeline and a second bypass pipeline sequentially according to a flow direction of the foam fluid in the experimental loop 50.

An eleventh valve 25 is installed on the first bypass pipeline. When only the eleventh valve 25 is opened, only the first bypass pipeline is opened, the foam fluids which are not sufficiently developed and are not stable in the experimental loop 50 in the experimental preparation stage are discharged, and the preliminary test and evaluation of the foam fluids are meaningless because these foam fluids are not sufficiently developed. The second bypass pipeline is connected to the foam property test module 200, and a twelfth valve 26 is installed on the second bypass pipeline. After the foam fluid is sufficiently developed, the twelfth valve 26 is opened, and the sufficiently developed foam fluid is transported to the foam property test module 200, thereby analyzing and testing the properties of the foam fluid.

The foam property test module 200 is configured to test and analyze the foam fluid output from the second bypass pipeline of the experimental loop 50, and includes an analysis tank 27. The analysis process is performed before foam defoaming separation processing. The analysis tank 27 is located in front of the foam separation processing module 300. The foam properties tested in the analysis tank 27 include foam volume, half foam life period and foam quality. The foam property test module 200 includes an analysis tank 27, and the analysis tank 27 is a visualized analysis tank 27 with standard scales. The developed foam fluid in the experimental loop 50 enters the analysis tank 27 through the second bypass pipeline, and the foam volume is read through the scales on the analysis tank 27. A gas outlet is formed on a side wall of the analysis tank 27, and a first absorption box 29 and a thirteenth valve 31 are sequentially installed outward from the gas outlet of the analysis tank 27. A first sampling valve 30 is installed on a main pipeline between the first absorption box 29 and the thirteenth valve 31, a water-absorbing and oil-absorbing material is placed in the first absorption box 29, and the gas in the analysis tank 27 is discharged to the atmosphere through the thirteenth valve 31. The first sampling valve 30 enables the gas in the analysis tank 27 to enter the gas collection bag through a pipeline, and the pipeline behind the first sampling valve 30 is preferably a rubber hose. A liquid outlet is formed at a lower end of the analysis tank 27, and a fourteenth valve 32 is installed on the liquid outlet. The fourteenth valve 32 is opened, and the liquid in the analysis tank 27 is discharged into the oil-water mixing kettle 5 again, so as to recycle the liquid.

The foam separation processing module 300 includes a visualized horizontal separator 40, the installation and disassembly of a plurality of defoaming separation components can be performed inside the horizontal separator 40, different foam separation processing can be obtained by the combination of different defoaming separation components, and the horizontal separator 40 is provided with standard scales. A foam separation processing manner of the foam separation processing module 300 is: the foam fluid directly enters the horizontal separator 40 through the main pipeline at the tail end of the experimental loop 50, and the foam volume is measured through the scales on the horizontal separator 40. A lower end of the horizontal separator 40 is coated with a second heating jacket 41 for heating the foam fluid in the horizontal separator 40. A gas-phase outlet is formed at an upper end of the horizontal separator 40, and a third temperature sensor 51 and a seventh pressure sensor 39 which are installed on the horizontal separator 40 are configured to measure the temperature in the horizontal separator 40. In addition, a liquid-phase outlet is formed at the lower end of the horizontal separator 40, and an eighteenth valve 42 is installed on the liquid-phase outlet. The eighteenth valve 42 is opened, and then, the separated liquid is input into the oil-water mixing kettle 5, so as to recycle the liquid.

The defoaming result evaluation module 400 performs observation, absorption, collection and measurement at the outlet of the foam separation processing module 300, so as to complete the analysis of defoaming separation results. The defoaming result evaluation module 400 includes a droplet size observation window 43 at the gas-phase outlet of the foam separation processing module 300 and a second absorption box 44 installed at the tail end of the droplet size observation window 43. The gas-phase outlet of the foam separation processing module 300 refers to a total gas-phase outlet after the gas-phase outlets of the horizontal separator 40 and a pipe column type cyclone separator 52 are gathered. A water-absorbing and oil-absorbing material is also placed in the second absorption box 44, and an outlet of the second absorption box 44 is provided with two pipelines. A nineteenth valve 45 and a second gas-phase flow meter 46 are sequentially installed on the first pipeline according to a gas flow sequence, the gas is discharged into the atmosphere through this pipeline, and the purpose of this pipeline is to measure the flow rate of the gas passing through the first pipeline by means of the second gas-phase flow meter 46. A twentieth valve 48 and a second sampling valve 47 are installed on the second pipeline, the second sampling valve 47 is connected to the gas collection bag through a gas pipe, the gas pipe is preferably a rubber hose, and the gas can be discharged into the atmosphere by opening the twentieth valve 48.

The liquid discharged from the horizontal separator 40 and the liquid discharged from the analysis tank 27 are transported to the second centrifugal pump 8 through a pipeline, and a twenty-first valve 49 is arranged on the pipeline. The third valve 7 is opened, and driven by the second centrifugal pump 8, the liquid discharged from the horizontal separator 40 and the liquid discharged from the analysis tank 27 are re-circulated into the oil-water mixing kettle 5 through a liquid-phase backflow inlet on the oil-water mixing kettle 5, so as to complete a liquid cycle.

Some of the above valves may be various types or models of valves, wherein the first valve 3, the second valve 6, the third valve 7, the eleventh valve 25, the twelfth valve 26, the thirteenth valve 31, the fourteenth valve 32, the fifteenth valve 33, the seventeenth valve 38, the eighteenth valve 42, the nineteenth valve 45, the twentieth valve 48 and the twenty-first valve 49 are preferably ball valves for opening and closing the corresponding pipelines. In addition, there are some relatively specific valves which are only the same function type of valves. The fourth valve 9 adopts a gate valve so that the fluid pumped into the foam generation device 24 by the second centrifugal pump 8 can only be circulated or not circulated, and the adjustment of the flow rate cannot be realized. The fifth valve 11 adopts a check valve to prevent the fluid from flowing back to the first liquid-phase flow meter 10. The gate valve adopted by the fourth valve 9 and the check valve adopted by the fifth valve 11 cooperate to enable the first liquid-phase flow meter 10 to accurately measure the flow rate of the fluid pumped into the foam generation device 24 by the second centrifugal pump 8, without the influence of valve flow adjustment and backflow on fluid flow measurement. The sixth valve 13 adopts a pressure reducing valve to reduce an outlet pressure of the $CO_2$ gas cylinder to a required pressure, and the pressure is automatically kept stable by virtue of the energy of $CO_2$, so that $CO_2$ enters the gas storage tank 17 at a stable pressure. The seventh valve 14 adopts a vent valve, the eighth valve 19 adopts a pressure reducing valve, the tenth valve 20 adopts a needle valve, and the eleventh valve 23 adopts a check valve. Three valves are used in conjunction with the gas storage tank 17, so that the pressure and gas flow rate measured by the second pressure sensor 21 and the first gas-phase flow meter 22 are very accurate to avoid inaccurate measurement results caused by unstable gas flow.

A plurality of gas collection bags are recorded in the present disclosure and are configured to collect gases from a plurality of gas outlets, thereby preventing the gases from being mixed in one gas collection bag.

All the above-mentioned pressure sensors, liquid-phase flow meters, gas-phase flow meters and temperature sensors are connected to a data acquisition system to accurately collect and record pressures, temperatures and flow rates.

Embodiment 2

The foam separation processing module 300 in the present disclosure adopts a second technical solution. On the basis of Example 1, a pipe column type cyclone separator 52 is additionally provided, and the pipe column type cyclone separator 52 is installed at the upper end of the horizontal separator 40. A main pipeline at the tail end of the experimental loop 50 is provided with three bypass pipelines, namely a first bypass pipeline, a second bypass pipeline and a third bypass pipeline sequentially according to a flow direction of the foam fluid in the experimental loop 50. The third bypass pipeline is connected to the pipe column type cyclone separator 52 in the foam separation processing module 300, a sixteenth valve 35 is installed on the third bypass pipeline, and a fifth pressure sensor 36 is installed on the third bypass pipeline between the sixteenth valve 35 and the pipe column type cyclone separator 52. When the sixteenth valve 35 is opened, the foam fluid enters the pipe column type cyclone separator 52 through the third bypass pipeline. The main pipeline at the tail end of the experimental loop 50 is connected into the horizontal separator 40, a fifteenth valve 33 is installed on the main pipeline at the tail end of the experimental loop 50, a fourth pressure sensor 34 is installed on the main pipeline between the fifteenth valve 33 and the horizontal separator 40, and the sixteenth valve 35 adopts a ball valve.

A foam separation processing manner of the foam separation processing module 300 is: the foam fluid enters the pipe column type cyclone separator 52 through the third bypass pipeline of the experimental loop 50, and then flows into the horizontal separator 40 from the pipe column type cyclone separator 52. A sixth pressure sensor 37 is installed on the pipe column type cyclone separator 52, a gas-phase outlet is formed at an inlet of the pipe column type cyclone separator 52 for introducing the foam fluid, the gas-phase outlet of the pipe column type cyclone separator 52 is communicated to the gas-phase outlet of the horizontal separator 40 through a gas pipe, and a seventeenth valve 38 is installed on the gas pipe.

All the above-mentioned pressure sensors, liquid-phase flow meters, gas-phase flow meters and temperature sensors are connected to a data acquisition system to accurately collect and record pressures, temperatures and flow rates.

The present disclosure can select the influences of two different inlets and different defoaming components recorded in Example 1 and Example 2 on defoaming separation test results according to different degrees of oil foaming.

Embodiment 3

The present disclosure provides an experimental method for testing foam fluid properties and defoaming separation effects, which uses the experimental device disclosed in Example 1 of the present disclosure for measuring. Experimental operation processes are as follows:

Step 1: Preparation stage: the $CO_2$ gas in the $CO_2$ gas cylinder is transported into the gas storage tank 17, the $CO_2$ gas is introduced into the entire experimental device from the gas storage tank 17 to remove impurities in the pipe, and the opening states of the valves of the horizontal separator 40 are adjusted, wherein the gas-phase outlet of the horizontal separator 40 is opened, and the liquid-phase outlet of the horizontal separator 40 is closed.

Step 2: Foam fluid generation stage: the eighth valve 19 is adjusted, the $CO_2$ gas is adjusted to a required gas flow rate, the $CO_2$ gas is introduced into the foam generation device 24, at the same time, the second ball valve 6 at the lower end of the oil-water mixing kettle 5 is opened, the third ball valve 7 is closed, the second centrifugal pump 8 and the fourth valve 9 are opened, the liquid with a required flow rate is transported into the foam generation device 24 according to the output power of the second centrifugal pump 8, the liquid is an oil-water mixture, and the $CO_2$ gas with a design flow rate and the liquid with a design flow rate are mixed in the foam generation device 24 to generate a foam fluid.

Step 3: Foam fluid transportation stage: the foam fluid enters the experimental loop 50, the eleventh valve 25 is opened first to discharge the unstable and insufficiently developed foam, after the output of the foam fluid is stable, the eleventh valve 25 is closed, the twelfth valve 26 is opened, the foam fluid is input into the analysis tank 27, and the twelfth valve 26 is closed after waiting for a specified time.

Step 4: Foam fluid defoaming stage: the twelfth valve 26 is closed and the fifteenth valve 33 is opened at the same time to enable the foam fluid to enter the horizontal separator 40, when a liquid level of the foam fluid reaches half the height of the separator, the eighth valve 19, the ninth valve 20, the second valve 6, the fourth valve 9 and the fifteenth valve 33 are closed, the $CO_2$ gas and the oil-water mixed liquid are no longer input into the foam generation device 24, and the foam fluid no longer enters the horizontal separator 40.

Step 5: Test stage: foam properties are tested in the analysis tank 27, including: the foam volume is read through scales, and the half foam life period is analyzed and the foam quality is measured in the analysis tank 27; the water-absorbing and oil-absorbing materials in the first absorption box 29 and the second absorption box 44 are weighed before and after an experiment to obtain a quality difference; an indication of the second gas-phase flow meter 46 at the gas-phase outlet of the horizontal separator 40 is read to calculate a liquid content in the gas after separation; foam layers of the horizontal separator 40 are shot by a high-speed camera to complete the statistics of bubble size distribution; and the droplet size observation window 43 at the gas-phase outlet of the horizontal separator 40 is detected by a laser particle size analyzer to analyze droplet sizes in a gravity settling zone, and a pressure difference during separation is calculated according to the pressures measured by the seventh pressure sensor 39 before and after separation.

Step 6: Liquid recovery stage: after the experiment, the eighteenth valve 42, the fourteenth valve 32, the twenty-first valve 49 and the third valve 7 are opened, the second centrifugal pump 8 is started, and the liquid in the analysis tank 27 and the horizontal separator 10 is pumped back into the oil-water mixing kettle 5.

Embodiment 4

The present disclosure provides an experimental method for testing foam fluid properties and defoaming separation effects, which uses the experimental device disclosed in Example 2 of the present disclosure for measuring. Experimental operation processes are as follows:

Step 1: Preparation stage: the $CO_2$ gas in the $CO_2$ gas cylinder is transported into the gas storage tank 17, the $CO_2$ gas is introduced into the entire experimental device from the gas storage tank 17 to remove impurities in the pipe, and the opening states of the valves of the horizontal separator 40 are adjusted, wherein the gas-phase outlet of the horizontal separator 40 is opened, and the liquid-phase outlet of the horizontal separator 40 is closed.

Step 2: Foam fluid generation stage: the eighth valve 19 is adjusted, the $CO_2$ gas is adjusted to a required gas flow rate, the $CO_2$ gas is introduced into the foam generation device 24, at the same time, the second ball valve 6 at the lower end of the oil-water mixing kettle 5 is opened, the third ball valve 7 is closed, the second centrifugal pump 8 and the fourth valve 9 are opened, the liquid with a required flow rate is transported into the foam generation device 24 according to the output power of the second centrifugal pump 8, the liquid is an oil-water mixture, and the $CO_2$ gas with a design flow rate and the liquid with a design flow rate are mixed in the foam generation device 24 to generate a foam fluid.

Step 3: Foam fluid transportation stage: the foam fluid enters the experimental loop 50, the eleventh valve 25 is opened first to discharge the unstable and insufficiently developed foam, after the output of the foam fluid is stable, the eleventh valve 25 is closed, the twelfth valve 26 is opened, the foam fluid is input into the analysis tank 27, and the twelfth valve 26 is closed after waiting for a specified time.

Step 4: Foam fluid defoaming stage: the twelfth valve 26 is closed and the sixteenth valve 35 is opened at the same time to enable the foam fluid to enter the pipe column type cyclone separator 52 and then enter the horizontal separator 40 through the pipe column type cyclone separator 52, when a liquid level of the foam fluid reaches half the height of the separator, the eighth valve 19, the ninth valve 20, the second valve 6, the fourth valve 9 and the fifteenth valve 33 are closed, the $CO_2$ gas and the oil-water mixed liquid are no longer input into the foam generation device 24, and the foam fluid no longer enters the horizontal separator 40.

Step 5: Test stage: foam properties are tested in the analysis tank 27, including: the foam volume is read through scales, the half foam life period is calculated, and the foam quality is measured; the water-absorbing and oil-absorbing materials in the first absorption box 29 and the second absorption box 44 are weighed before and after an experiment to obtain a quality difference; an indication of the second gas-phase flow meter 46 at the gas-phase outlet of the horizontal separator 40 is read to calculate a liquid content in the gas after separation; foam layers of the horizontal separator 40 are shot by a high-speed camera to complete the statistics of bubble size distribution; the droplet size observation window 43 at the gas-phase outlet of the horizontal separator 40 is detected by a laser particle size analyzer to analyze droplet sizes in a gravity settling zone; and a pressure difference during separation is calculated according to the pressures of the fifth pressure sensor 36, the sixth pressure sensor 37 and the seventh pressure sensor 39 before and after separation.

Step 6: Liquid recovery stage: after the experiment, the eighteenth valve 42, the fourteenth valve 32, the twenty-first valve 49 and the third valve 7 are opened, the second centrifugal pump 8 is started, and the liquid in the analysis tank 27 and the horizontal separator 10 is pumped back into the oil-water mixing kettle 5.

The foregoing are only exemplary embodiments of the present disclosure, and are not intended to limit the present disclosure. A person skilled in the art may make various modifications and changes to the present disclosure. Any modification, equivalent replacement, improvement, and the like made within the spirit and principle of the present disclosure shall fall within the protection scope of the present disclosure.

Although the specific embodiments of the present disclosure have been described above in conjunction with the accompanying drawings, they do not limit the protection scope of the present disclosure. A person skilled in the art should understand that on the basis of the technical solutions of the present disclosure, various modifications or deformations that can be made by a person skilled in the art without creative efforts still fall within the protection scope of the present disclosure.

What is claimed is:

1. An experimental device for testing foam fluid properties and defoaming separation effects, comprising a foam generation module, an experimental loop, a foam property test module, a foam separation processing module and a defoaming result evaluation module, wherein
  a tail end of the foam generation module is connected to the experimental loop, different ratios of oil-water and $CO_2$ gas are mixed in the foam generation module to form a foam fluid, and the foam fluid is transported into the experimental loop;
  the foam fluid is developed inside the experimental loop and is respectively transported to the foam property test module and the foam separation processing module at a tail end of the experimental loop;
  the foam property test module receives the foam fluid that is sufficiently developed in the experimental loop, and analyzes a foam volume, a half foam life period and a foam quality of the foam fluid that is sufficiently developed;
  the foam separation processing module receives the foam fluid that is sufficiently developed in the experimental loop, and separates the foam fluid that is sufficiently developed into gas and liquid; and
  the foam separation processing module is provided with the defoaming result evaluation module, and the defoaming result evaluation module analyzes the gas separated by the foam separation processing module to obtain a liquid content in the gas, a droplet size in the gas and an oil content in the gas;
  the foam generation module comprises an oil-water mixing kettle, a $CO_2$ gas cylinder and a foam generation device, and the foam generation device is respectively connected to the oil-water mixing kettle and the $CO_2$ gas cylinder through two connecting pipelines; and
  the connecting pipeline from the oil-water mixing kettle to the foam generation device is sequentially provided with a second centrifugal pump and a first flow meter according to a liquid flow direction, the connecting pipeline from the $CO_2$ gas cylinder to the foam generation device is sequentially provided with a gas storage tank and a first gas-phase flow meter according to a gas flow direction, and the oil-water mixed liquid in the oil-water mixing kettle and the $CO_2$ gas in the $CO_2$ gas cylinder enter the inside of the foam generation device through a liquid-phase pipeline inlet at a bottom of the foam generation device and a gas-phase pipeline inlet on a side wall of the foam generation device;

the tail end of the experimental loop is sequentially provided with a first bypass pipeline and a second bypass pipeline according to a flow direction of the foam fluid, and a main pipeline at the tail end of the experimental loop is connected to the foam separation processing module;

the foam property test module comprises an analysis tank, a lower end of the analysis tank is provided with a liquid-phase outlet, a side wall of the analysis tank is provided with a gas outlet, a first absorption box and a first sampling valve are sequentially installed outward from the gas outlet, a water-absorbing and oil-absorbing material is placed in the first absorption box, and the first sampling valve is connected to a gas collection bag through a pipeline;

the foam separation processing module comprises a horizontal separator, the horizontal separator is a visualized tank body, and a side wall of the tank body is provided with standard scales;

a lower end of the horizontal separator is provided with a liquid-phase outlet, the periphery of the lower end of the horizontal separator is coated with a second heating jacket, an upper end of the horizontal separator is provided with a gas-phase outlet, and the gas-phase outlet on the horizontal separator is connected to the defoaming result evaluation module;

the upper end of the horizontal separator is also provided with a pipe column type cyclone separator, a lower end of the pipe column type cyclone separator is communicated to the horizontal separator, the main pipeline at the tail end of the experimental loop is also provided with a third bypass pipeline, the third bypass pipeline is connected to the pipe column type cyclone separator, and the foam fluid that is sufficiently developed enters the pipe column type cyclone separator through the third bypass pipeline of the experimental loop, and then flows into the horizontal separator from the pipe column type cyclone separator;

a foam fluid inlet of the pipe column type cyclone separator is provided with a gas-phase outlet, and the gas-phase outlet of the pipe column type cyclone separator is communicated to the gas-phase outlet of the horizontal separator through a gas pipe; and the gas-phase outlet of the horizontal separator is connected to the defoaming result evaluation module;

the defoaming result evaluation module comprises a droplet size observation window and a second absorption box at a tail end of the droplet size observation window;

a water-absorbing and oil-absorbing material is placed in the second absorption box.

2. The experimental device for testing foam fluid properties and defoaming separation effects according to claim 1, wherein a stainless steel wire mesh with mesh holes is arranged inside the foam generation device; and the gas-phase pipeline inlet and the liquid-phase pipeline inlet of the foam generation device are arranged at 90° in space.

3. The experimental device for testing foam fluid properties and defoaming separation effects according to claim 1, wherein the first bypass pipeline is connected to the atmosphere, and configured to discharge the foam fluid that is insufficiently developed in the experimental loop; and the second bypass pipeline is connected to the foam property test module, and configured to discharge the foam fluid that is sufficiently developed in the experimental loop into the foam property test module.

4. The experimental device for testing foam fluid properties and defoaming separation effects according to claim 1, wherein the analysis tank is a visualized tank body, and a side wall of the tank body is provided with standard scales.

5. The experimental device for testing foam fluid properties and defoaming separation effects according to claim 1, wherein the gas separated by the foam separation processing module sequentially passes through the droplet size observation window and the second absorption box, an outlet of the second absorption box is provided with two pipelines, the first pipeline is communicated to the atmosphere, the first pipeline is provided with a second gas-phase flow meter, the second pipeline is provided with a second sampling valve, and the second sampling valve is connected to the gas collection bag through a gas pipe.

6. The experimental device for testing foam fluid properties and defoaming separation effects according to claim 1, wherein a kettle cover of the oil-water mixing kettle is provided with a liquid-phase backflow inlet, and the remaining liquid in the foam property test module and the foam separation processing module circularly flows back into the oil-water mixing kettle.

7. An experimental method using the experimental device for testing foam fluid properties and defoaming separation effects according to claim 5, comprising:

step 1: preparation stage: introducing $CO_2$ gas into the entire experimental device to remove impurities in the pipe;

step 2: foam fluid generation stage: introducing the $CO_2$ gas with a required gas flow rate into the foam generation device, transporting the oil-water mixed liquid with a required liquid flow rate into the foam generation device at the same time, and mixing the $CO_2$ gas and the oil-water mixed liquid in the foam generation device to generate a foam fluid;

step 3: foam fluid transportation stage: transporting the foam fluid into the experimental loop to develop, communicating the first bypass pipeline to discharge the foam fluid that is unstable and insufficiently developed in the experimental loop, and after the output of the foam fluid that is unstable and insufficiently developed, the foam fluid in the experimental loop is sufficiently developed, communicating the second bypass pipeline to input the foam fluid that is sufficiently developed into the foam property test module;

step 4: foam fluid defoaming stage: communicating the main pipeline at the tail end of the experimental loop to enable the foam fluid that is sufficiently developed to enter the horizontal separator, and when a liquid level of the foam fluid that is sufficiently developed reaches half a height of the horizontal separator, closing the input of the foam fluid that is sufficiently developed so that the foam fluid that is sufficiently developed no longer enters the horizontal separator; and step 5: test stage: measuring the foam volume of the foam fluid that is sufficiently developed in the foam property test module, analyzing the half foam life period, and measuring the foam quality of the foam fluid that is sufficiently developed; weighing the water-absorbing and oil-absorbing material before and after an experiment to obtain a quality difference; reading an indication of the second gas-phase flow meter at the gas-phase outlet of the horizontal separator to calculate a liquid content in the gas after separation; shooting foam layers of the horizontal separator by a high-speed camera to complete the statistics of bubble size distribution; and detecting the droplet size observation window at the gas-phase outlet of the horizontal separator by a laser particle size analyzer to analyze droplet sizes in a gravity settling zone, and calculating pressure differences before and after separation in the foam separation processing module to calculate a pressure difference during separation.

8. An experimental method using the experimental device for testing foam fluid properties and defoaming separation effects according to claim 5, comprising:

step 1: preparation stage: introducing $CO_2$ gas into the entire experimental device to remove impurities in the pipe;

step 2: foam fluid generation stage: introducing the $CO_2$ gas with a required gas flow rate into the foam generation device, transporting the oil-water mixed liquid with a required liquid flow rate into the foam generation device at the same time, and mixing the $CO_2$ gas and the oil-water mixed liquid in the foam generation device to generate a foam fluid;

step 3: foam fluid transportation stage: transporting the foam fluid into the experimental loop to develop, communicating the first bypass pipeline to discharge the foam fluid that is unstable and insufficiently developed in the experimental loop, and, after the output of the foam fluid that is unstable and insufficiently developed, the foam fluid in the experimental loop is sufficiently developed, communicating the second bypass pipeline to input the foam fluid that is sufficiently developed into the foam property test module;

step 4: foam fluid defoaming stage: communicating the third bypass pipeline to enable the foam fluid that is sufficiently developed to enter the pipe column type cyclone separator and then enter the horizontal separator, and when a liquid level of the foam fluid that is sufficiently developed reaches half the height of the separator, closing the input of the foam fluid that is sufficiently developed so that the foam fluid that is sufficiently developed no longer enters the horizontal separator; and step 5: test stage: measuring the foam volume of the foam fluid that is sufficiently developed in the foam property test module, analyzing the half foam life period, and measuring the foam quality of the foam fluid that is sufficiently developed; weighing the water-absorbing and oil-absorbing material before and after an experiment to obtain a quality difference; reading an indication of the second gas-phase flow meter at the gas-phase outlet of the horizontal separator to calculate a liquid content in the gas after separation; shooting foam layers of the horizontal separator by a high-speed camera to complete the statistics of bubble size distribution; and detecting the droplet size observation window at the gas-phase outlet of the horizontal separator by a laser particle size analyzer to analyze droplet sizes in a gravity settling zone, and calculating pressure differences before and after separation in the foam separation processing module to calculate a pressure difference during separation.

\* \* \* \* \*